United States Patent
O'Kell et al.

(10) Patent No.: US 11,719,574 B2
(45) Date of Patent: Aug. 8, 2023

(54) INDICATOR

(71) Applicant: SAF-T-GLO LIMITED, Cwmbran (GB)

(72) Inventors: Sean Patrick O'Kell, Cwmbran (GB); Andrew Jon Hallett, Cwmbran (GB)

(73) Assignee: SAF-T-GLO LIMITED, Cwmbrand (GB)

( * ) Notice: Subject to any disclaimer, the term of this patent is extended or adjusted under 35 U.S.C. 154(b) by 0 days.

(21) Appl. No.: 17/721,090

(22) Filed: Apr. 14, 2022

(65) Prior Publication Data

US 2022/0333984 A1    Oct. 20, 2022

(30) Foreign Application Priority Data

Apr. 16, 2021  (GB) ...................... 2105485

(51) Int. Cl.
*G01J 1/58*    (2006.01)

(52) U.S. Cl.
CPC ...................... *G01J 1/58* (2013.01)

(58) Field of Classification Search
CPC ...................... G01J 1/58; C09K 9/00
See application file for complete search history.

(56) References Cited

U.S. PATENT DOCUMENTS

| | | |
|---|---|---|
| 3,597,054 A | 8/1971 | McGowin |
| 4,255,665 A | 3/1981 | Shriner |
| 4,818,491 A | 4/1989 | Fariss |
| 5,378,896 A | 1/1995 | Knjaschewitsch et al. |
| 2009/0084981 A1* | 4/2009 | Bown ................ G01N 21/8806 235/375 |
| 2014/0001376 A1 | 1/2014 | Liu et al. |

FOREIGN PATENT DOCUMENTS

| | | | |
|---|---|---|---|
| CN | 109945971 B | 6/2019 | |
| CN | 212756495 U | 3/2021 | |
| DE | 102010013233 A1 * | 12/2010 | ....... B32B 17/10036 |
| GB | 2 200 987 A | 8/1988 | |
| GB | 2 365 521 A | 2/2002 | |
| GB | 2 427 464 A | 12/2006 | |
| JP | H06-180250 A | 6/1994 | |
| RU | 2731655 C1 | 9/2020 | |

OTHER PUBLICATIONS

British Search Report on GB Appl. Ser No. GB 2105485.3 dated Jul. 28, 2021 (4 pages).
British Search Report on GB Appl. Ser No. GB 2204761.7 dated Jul. 19, 2022 (4 pages).

* cited by examiner

*Primary Examiner* — David P Porta
*Assistant Examiner* — Fani Polyzos Boosalis
(74) *Attorney, Agent, or Firm* — Foley & Lardner LLP

(57) ABSTRACT

A marker is arranged to indicate the presence of ultraviolet radiation. The marker includes at least an emitting layer having a fluorescent material arranged to emit visible light in a first range of wavelengths in response to excitation by ultraviolet radiation in a second range of wavelengths. The emission of visible light is reversible, and the marker is reusable. The marker may be a warning sign, and may be adhered to a surface or incorporated into a freestanding portable apparatus.

20 Claims, 3 Drawing Sheets

INDICATOR

CROSS-REFERENCE TO RELATED PATENT APPLICATIONS

The present application claims the benefit of and priority to United Kingdom Patent Application GB 2105485.3, filed Apr. 16, 2021, the entire disclosure of which, including the specification, drawings, claims, and abstract, is incorporated herein by reference.

BACKGROUND

The present application relates to an indicator device.

It is known that Ultraviolet (UV) light has been used for disinfection of surfaces and air. It is known that UV light is effective against biological pathogens such as viral, bacterial, fungal and parasitic agents.

UVA light is in the range from 315 nm to 400 nm. UVA light makes up the vast majority of the UV radiation reaching the surface of the Earth. UVA light is known to penetrate deep into the skin. It is thought that UVA light is responsible for up to 80% of skin ageing in human skin.

It has been found in studies that near UV blue light that is light which is around 405 nm can kill certain bacteria if the bacteria are exposed to the near UV blue light for a long enough period. It has been found that near UV blue light is ineffective against viruses.

UVB light is in the range from 280 nm to 315 nm. UVB light is known to damage DNA in the skin and can lead to sunburn. It is thought to be a major contributor to causing skin cancer. It is believed that UVB light may be effective against biological agents if the duration of exposure is long enough.

UVC light is in the range from 200 nm to 280 nm. This range of UV light is believed to be particularly effective against a number of microorganism species. The UVC light is believed to damage the DNA of pathogens preventing the microorganisms from replicating. UVC light is believed to be damaging to human skin and DNA at relatively low dosages. Even short durations of exposure are believed to be dangerous to human health. UVC is not commonly a problem as most UVC is absorbed in the atmosphere and does not reach the surface of the Earth.

UVC radiation at 254 nm is known to provide a very strong germicidal effect. The use of UVC light to inactivate biological pathogens is also known as germicidal irradiation or as UVGI. It is known that UVC radiation at 254 nm is damaging to human cells.

Other UVC wavelengths such as 222 nm have been found to be a lower human health hazard as the radiation is not able to penetrate through an outer dead-cell layer of the human skin or the tear layer in the eye. Viruses and bacteria are much smaller than human cells and the UVC radiation at 222 nm is able to penetrate to the DNA and to cause damage that prevents replication of viruses and bacteria.

UVV is radiation in the range of from 100 nm to 200 nm. Radiation with wavelengths in this range such as 185 nm generates ozone by reaction with oxygen molecules. Inhalation of ozone is known to cause damage to lungs. It is known that relatively low levels of ozone can cause chest pain, coughing, shortness of breath and throat irritation.

Typically, radiation in the range 100 nm to 280 nm has been found to be effective against mold. Radiation in the range 200-230 nm has been found to be effective against viruses, COVID-19, MRSA and aerosolized viruses. Radiation in the range 250-270 nm has been found to be effective against bacteria including E Coli.

UVC lights are increasingly being used for disinfecting surfaces and areas against pathogenic viruses and microorganisms such as bacteria, without the need to deep clean the surfaces and area with solvents. Radiation in the UVC range of wavelengths has been used for disinfecting water, sterilizing surfaces, destroying microorganisms on surfaces and in the air. As discussed, some wavelengths of UVC such as 222 nm are safer for humans but other UVC radiation which can severely damage human tissue. Damage to eyes is a particular concern with the use of UVC light. A problem with UV radiation is that it is not visible to the human eye.

SUMMARY

According to an exemplary embodiment, a marker is arranged to indicate the presence of ultraviolet radiation. The marker includes at least an emitting layer having a fluorescent material arranged to emit visible light in a first range of wavelengths in response to excitation by ultraviolet radiation in a second range of wavelengths. The emission of visible light is reversible, and the marker is reusable.

According to another exemplary embodiment, method provides a warning of the presence of ultraviolet radiation. The method includes affixing a marker to a surface as a warning sign. The marker includes at least an emitting layer having a fluorescent material arranged to emit visible light in a first range of wavelengths in response to excitation by ultraviolet radiation in a second range of wavelengths. The fluorescence is reversible, and the marker is reusable.

BRIEF DESCRIPTION OF THE DRAWINGS

The invention will now be further described with reference to the following figures in which.

DETAILED DESCRIPTION

Figure 1:
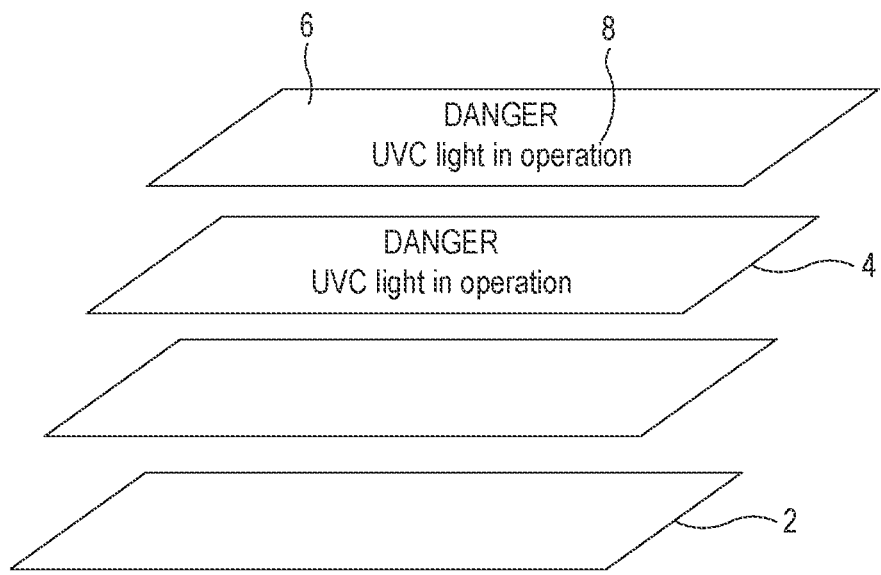
FIG. 1 is a schematic illustration of a marker in accordance with an exemplary embodiment.

It is an object of the invention to provide an indicator to provide a visible warning that UV radiation is being used in an area. A visible warning is able to warn of the danger in the area.

In accordance with a first exemplary embodiment, there is provided a marker arranged to indicate the presence of ultraviolet radiation, the marker comprising at least an emitting layer having a fluorescent material arranged to emit visible light in a first region (i.e., range of wavelengths) in response to excitation by the ultraviolet radiation in a second region (i.e., range of wavelengths). The fluorescence is reversible, and the marker is reusable.

Using fluorescence (as opposed to other types of luminescence such as, for example, phosphorescence), means that the emission of light in response to exposure to UV is effectively immediate. Similarly, the emission of light ceases near-instantaneously when the UV exposure ends (for example within 20 nanoseconds of UV radiation ceasing, as opposed to phosphorescence, which can linger for a significant time period thereafter). The visible light emitted by the marker is therefore generally only visible for as long as UV radiation is present. By contrast, a phosphorescent material can store the absorbed light energy for a period of time and release light later, resulting in an afterglow that persists after the UV radiation ceases, potentially for multiple hours. In addition, the brightness of a phosphorescent material generally gradually increases over time with exposure, whereas fluorescence gives a more immediate full intensity. The marker is therefore either "on" or "off", thus informing a user of the current presence or absence of UV light. Use of fluorescent materials therefore advantageously provides clear and immediate feedback when UV irradiation starts and stops. No information as to the duration of exposure or corresponding dosage may be provided. Instead, an instantaneous warning is provided. The fluorescence therefore draws attention to a current/ongoing potential health hazard, and ceases as soon as that hazard (the UV radiation) is removed.

Indeed, the material used for the emitting layer may be deliberately selected to exhibit no phosphorescence (or only an insignificant trace of phosphorescence) such that no after-glow is visible to the human eye after UV exposure is terminated. A viewer may therefore know immediately when an area is safe to enter.

Further, the fluorescent materials selected are chosen to be reusable—in particular, requiring no treatment after exposure to UV and their corresponding fluorescence to allow them to fluoresce again. The process is fully reversible, not requiring any energy input or processing to return the material to its original, pre-fluorescence, state. The marker may therefore be left in situ, with no treatment, between uses as an indicator of the presence of UV. In addition, no electrical lighting or other power is needed for the marker to function; the UV radiation itself "powers" the fluorescence. The marker may therefore comprise no electrical components. The marker may therefore be low/zero maintenance (dusting and/or cleaning may be performed as for any surface or sign to maintain its visibility). There may be no limit to the number of times the marker can switch between "on" and "off", other than general wear and tear.

The marker may be a warning sign. The fluorescence is arranged to be clearly visible by eye such that a viewer is immediately warned of the presence of UV radiation. Printed wording and/or symbols (e.g., indicia, markings) may be provided on the marker. For example, a warning such as "If sign is glowing, avoid area—UV radiation" may be printed on the marker. The printed indicia may form a warning symbol/wording, or may provide a mask as a negative of the warning symbol/wording, such that the symbol/wording is provided by a visible region of the fluorescent material, while other portions of the fluorescent material are covered by the mask. Alternatively or additionally, the fluorescent material itself may be arranged/shaped to form a warning indication.

In some embodiments, a marker includes at least a substrate having an upper surface and a lower surface. The upper surface of the marker is arranged to be visible in use. The substrate may comprise a vinyl layer or may be formed of other materials such as plastics, polymers, films, or polycarbonate, either alone or in combination(s). The substrate may be flexible or may be rigid. At least a portion of the upper surface has a layer of material made of or incorporating the fluorescent material arranged to emit visible light. The upper surface may have more than one area/portion having a layer of material with the fluorescent material. In some embodiments, the fluorescent material may be provided in portions of a layer applied to the substrate. The layer may be co-extruded or cast on or applied to the substrate. In some embodiments, the marker may comprise a cover over the fluorescent material and/or the upper surface of the substrate. The cover may be rigid or may be flexible. The cover may in some cases be fitted over the substrate. In other embodiments, the cover may be cast onto or applied to the substrate. In some embodiments, the marker may comprise a housing surrounding the marker.

In some embodiments, the second range of wavelengths (i.e. a wavelength range of the radiation) is from 200 nm to 300 nm. In some embodiments, the second range of wavelengths is from 200 nm to 254 nm. In some embodiments, the second range of wavelengths is from 200 nm to 250 nm.

In some embodiments, the second range of wavelengths may be from 200 nm to 280 nm, or 200 nm to 300 nm, so targeting UVC light. The marker may therefore be a warning sign for the presence of UVC light. Ultraviolet radiation in the second range of wavelengths may therefore mean UVC radiation.

The marker may be, or may function as, a warning sign arranged to provide a visual indication of the presence or absence of the ultraviolet radiation in the second range/region.

The marker comprises an emitting layer that fluoresces in the presence of UV radiation. It will be appreciated that fluorescence is the result of excitation of molecules and the decay time before the molecule emits a photon and returns to an unexcited state is in the range of a few nanoseconds. Typical decay times are about 0.5 to 20 nanoseconds. The marker emits visible light only when the UV light is present (noting that the maximum decay time after termination of the UV radiation is on the order of tens of nanoseconds, an immaterial "delay" with respect to human processing, decision-making, and movement).

The marker is arranged to be activated by the presence of ultraviolet radiation. The marker indicates that there is an active risk of danger from ultraviolet radiation. The marker is therefore informative of an actual risk to health in contrast to existing markers and signs that are placed in areas where UV radiation may be used. It is an advantage that the marker fluoresces in the presence of UV light (and ceases emission near-instantaneously when UV light ceases to be present) and is reversible and reusable.

In some embodiments, the fluorescent material is provided in a carrier material. In some embodiments, the marker comprises a protective layer. In some embodiments, the marker may comprise a fluorescent material in a carrier and a protective layer. The carrier material and/or the protective layer may be impermeable to liquid and/or gas, and may prevent the fluorescent material from being wetted, for example, during cleaning of a surface to which the marker is attached. The carrier material and/or the protective layer may be at least partially transparent to radiation in both the first and the second range of wavelengths. It will be appreciated that the transparency of materials to UVC radiation is dependent on the chemical composition of the materials. In some embodiments, the materials of the carrier and/or the protective layer are transparent to radiation with wavelengths from 200 nm to 290 nm and to visible light. Many materials, such as plastics and resins, are transparent to radiation having wavelengths greater than 300 nm but are not transparent to radiation from 200 nm to 290 nm.

A further requirement of the carrier or material or the protective layer is that the plastics material (or other material) is stable under the influence of UVC radiation. UVC radiation can cause a photochemical effect within a plastics polymer structure. The photochemical effect will lead to degradation of the plastics material. Absorbed UV energy can lead to excitation of photons in the plastics material. Free radicals then cause breaks in the polymer bonds. High energy UVC has a particular photochemical effect.

In some embodiments, polyurethane may be used as the carrier material or protective cover. It has been found that polyurethane is robust and has good resistance to the effect of the UV radiation. It will be appreciated that other plastics materials having the necessary characteristics may also be utilized.

In some embodiments, the marker is adapted to be permanently or semi-permanently installed in a location. The location may be a vehicle or a building or a moveable apparatus. In one arrangement, the marker is adapted to be permanently or semi-permanently installed in confined space in the vehicle. The confined space may be, for example, an aircraft cabin, an aircraft cockpit, a train, or a military vehicle.

In some embodiments, the marker may take the form of an adhesive label or sticker, and may be arranged to be adhered to a surface. The marker may be flexible so as to facilitate it conforming to the shape of a surface to which it is to be adhered.

In some embodiments, the vehicle may be in accordance with the applicant's co-pending application. Such a vehicle comprises a disinfection system, which may utilize UV radiation, for example, UVC radiation, for disinfection. In a confined space, it is desirable that any occupants should be aware that the disinfection system is operating, that the confined space is exposed to UVC radiation, and that biological cleansing or disinfection is in operation. It is also desirable that the carrier or protective material also meets installation requirements in a space in which the marker is to be used. For example, the marker may have to meet aerospace or military specifications. In aircraft, for example, there are flammability standards that have to be met for all equipment installed in an aircraft. It may be necessary that the marker meets the certification standards such as CS25.853, which provides the specifications for large airplanes as required by the EASA (European Union Aviation Safety Agency). Standards set by DO 160 (Environmental Conditions and Test Procedures for Airborne Equipment) may also have to be met.

In some embodiments, the carrier material or the protective layer comprises polyurethane. It has been found that polyurethane allows excitation of the fluorescent material by radiation from 200 nm to 290 nm, i.e., by UVC radiation. Polyurethane is also at least partially transparent to radiation in the visible light range, that is, from 380 nm to 700 nm. Polyurethane has also been found to meet the required standards for installation in confined spaces in a vehicle, such as in aircraft or military vehicles.

The fluorescent material may be selected to absorb UVC radiation. In some embodiments, the UVC radiation is from 200 nm to 280 nm. In some embodiments, the radiation is from 200 nm to 254 nm. In some embodiments, the UVC radiation absorbed is from 200 nm to 250 nm.

It is desirable that the fluorescent material absorbs in the region from 200 nm to 280 nm and emits radiation in the visible region. It is desirable that the fluorescent material has a Stokes shift of 200 nm or more.

In some embodiments, the fluorescent material absorbs radiation in the UVC region, for example, radiation having a wavelength of 250 nm or less, and emits in a region of the visible spectrum that corresponds to scotopic vision. Scotopic vision is the vision of the eye under low light levels. In the human eye, there are cone cells and rod cells that are used for detection of light. In the human eye, cone cells are not functional in low light levels. If the light levels are low, the human eye relies on scotopic vision, which relies on rod cells. These cells are most sensitive to wavelengths between about 498 nm and about 500 nm. Emission of light in the region of scotopic sensitivity of the human eye enables even relatively low emission levels to be seen by a person entering the area where the light is emitted. Scotopic vision occurs at luminance levels of $10^{-3}$ cd/m$^2$ to $10^{-6}$ cd/m$^2$.

In some embodiments, the fluorescent material has an emission intensity of about 5 lux when excited by UVC light with a wavelength of 222 nm arranged to be about 50 cm from the marker. It will be appreciated that an output from the UVC indicator marker will be dependent on the intensity of the UVC light source, a distance from UVC light source to the marker, and a distance from the marker to a measuring device.

It is also desirable that the radiation emitted by the fluorescent material is detectable by the human eye in photopic vision. Photopic vision is the vision of the eye under well-lit conditions. Photopic vision dominates when the luminance levels are from 10 to $10^8$ cd/m$^2$. In photopic vision, there are three types of cones used to sense light in three bands of color: blue (about 420 nm), blue-green (about 534 nm), and yellow-green (about 564 nm).

In some embodiments, the fluorescent material may be a manganese doped zinc silicate such as zinc orthosilicate ($Zn_2SiO_4$). It has been found that this material has the desired excitation and emission properties. It will be appreciated that the skilled person will be able to utilize other phosphors having the desired excitation and emission properties.

In some embodiments, the fluorescent material is provided on a substrate. The substrate may be a flame retardant material. In some embodiments, the substrate may be flexible. The flame retardant material may be a thermoplastic polybutylene terephthalate.

The marker may comprise indicia or marking provided on a surface of the marker. The indicia may be provided by printing on a surface of the marker. The printing may be provided on an upper surface of the carrier material containing the fluorescent material. In other embodiments, the indicia may be printed on an upper surface of the protective layer. The indicia may provide a visual warning, for example, being or comprising lettering such as "WARNING" or "KEEP OUT—IRRADIATION IN PROGRESS" and/or a hazard symbol, arranged to be visible by eye. The marker may therefore be a warning sign interpretable by any viewers, whether or not they have been previously advised that a glowing sign indicates the presence of UV radiation that should be avoided.

The indicia may be printed using UV-cured printing. The printing may be in a color that matches a base color. The base color may be white. The printing may be in a white ink. In some embodiments, the white ink does not permit transmission of visible light.

In some embodiments, the indicia may be printed in a transparent ink that blocks the excitation of fluorescent materials (the "transparent ink" is therefore not transparent to the UV radiation, but is called transparent as it is transparent to visible light). It will be appreciated that only the regions that are not covered with the transparent ink will be able to absorb UV radiation and to fluoresce in the presence of UV radiation.

The indicia may therefore only be visible when the fluorescent material fluoresces (i.e., when the marker is being irradiated by UV radiation). The indicia may provide a warning that UV radiation is present and, for example, may be or comprise lettering such as, "WARNING—UV RADIATION".

In some embodiments, the indicia may be formed by the selective printing or placement of fluorescent material on the substrate.

In some embodiments, a vehicle or building includes a marker in accordance with the embodiments described above. The marker may be arranged to indicate the presence of ultraviolet radiation. The marker may include at least an emitting layer having a fluorescent material arranged to emit visible light in a first range of wavelengths in response to excitation by the ultraviolet radiation in a second range of wavelengths. The marker may be permanently installed on or in the vehicle or building In some embodiments, a portable apparatus includes a marker in accordance with the embodiments described above. The marker may be arranged to indicate the presence of ultraviolet radiation. The marker may include at least an emitting layer having a fluorescent material arranged to emit visible light in a first range of wavelengths in response to excitation by the ultraviolet radiation in a second range of wavelengths.

For example, the portable apparatus may be a freestanding warning sign arranged to be positioned in a room or space prior to irradiation, for example, similar to those often seen to warn of wet floors during cleaning but including a fluorescent marker as described herein. An extant sign may be modified to form a portable apparatus comprising a marker as described above, e.g. as a sticker applied thereto.

In some embodiments, a method of providing a warning of the presence of ultraviolet radiation is provided. The method may include affixing a marker to a surface as a warning sign. The marker may include at least an emitting layer having a fluorescent material configured to emit visible light in a first range of wavelengths in response to excitation by ultraviolet radiation in a second range of wavelengths. The fluorescence may be reversible, and the marker may be reusable. The marker may be arranged in accordance with the embodiments described above.

In some embodiments, the step of affixing the marker to a surface may include affixing the marker to an internal wall of an aircraft cabin. In some embodiments, the step of affixing the marker to a surface may include using an adhesive to secure the marker to the surface. The adhesive may be provided as an adhesive layer of the marker. The marker may therefore be in the form of a sticker or adhesive label.

The method may include leaving the marker in situ between irradiation events, with no treatment or re-setting of the fluorescent material being required (by contrast, heat treatment may be needed to "re-set" some light-emitting materials for re-use).

Referring now to the figures, FIG. 1 illustrates a marker 16 in accordance with an exemplary embodiment. The marker includes an emitting layer including a fluorescent material. The fluorescent material is arranged to emit visible light in a first range of wavelengths in response to excitation by ultraviolet radiation in a second range of wavelengths. In some embodiments, the fluorescence is emitted as a result of excitation of the fluorescent material by radiation in the UVC range. In some embodiments, the exciting radiation may be in the range of 200 nm to 300 nm. In some embodiments, the exciting radiation may be in the range of 200 nm to 254 nm, or from 200 nm to 250 nm.

The marker 16 includes at least a substrate having an upper surface and a lower surface. At least a portion of the upper surface has an emitting layer of material made of or incorporating a fluorescent material arranged to emit visible light. It will be appreciated that in some embodiments the upper surface may have more than one area/portion having a layer of material including the fluorescent material.

The emitting layer may be co-extruded, cast on, or applied to the substrate.

In some embodiments, the marker may comprise a cover over the fluorescent material and or the upper surface of the substrate. In some embodiments, the marker may include a housing surrounding the marker.

Figure 3:
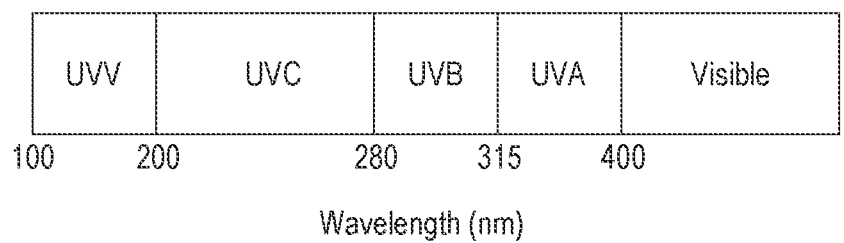
FIG. 3 illustrates UV and visible wavelengths of the electromagnetic spectrum.
Figure 4:
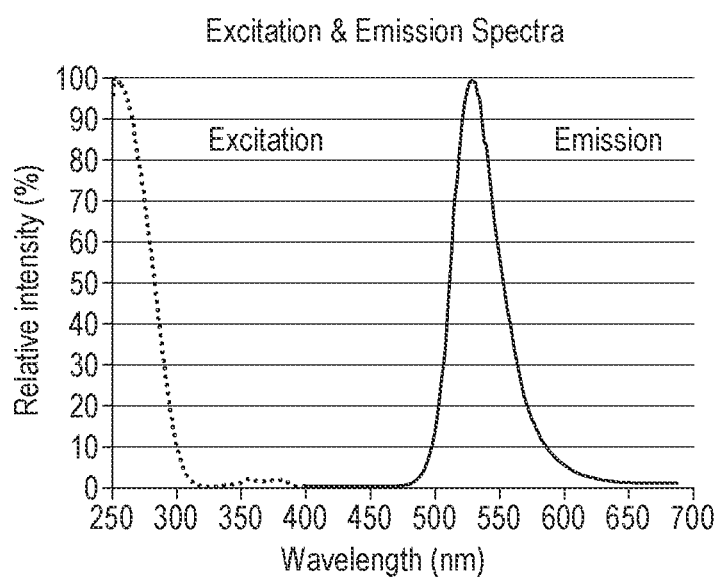
FIG. 4 shows excitation and emission spectra.
Figure 5:
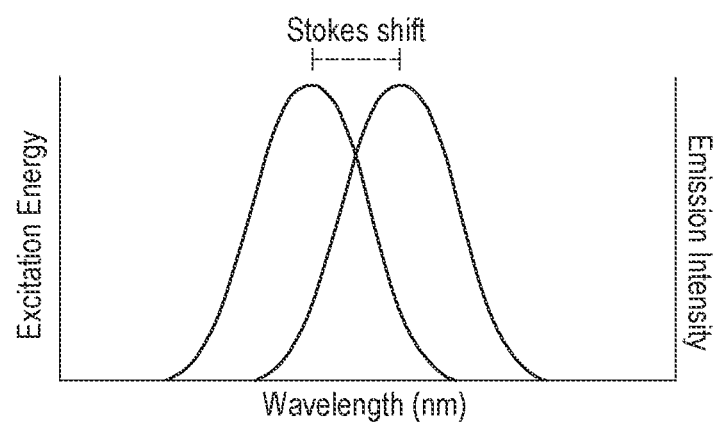
FIG. 5 is an illustration of a Stokes Shift.

The fluorescent material is able to absorb radiation in the second range of wavelengths. The radiation in the second range of wavelengths is absorbed and an electron in the material is excited. There is a short half-life (e.g. a few nanoseconds or less), and then a photon of visible light is emitted as the fluorescent material returns to a ground state. The energy emitted is in a different range of wavelengths, for example, the first range of wavelengths as described above. The first range of wavelengths is lower in energy that the second range of wavelengths. An illustration of the emission spectra of a fluorescent material is illustrated in FIG. 3. A shift between the electromagnetic radiation absorbed and emitted is known as a Stokes shift. In some embodiments, the Stokes shift is 200 nm or more. An illustration of a Stokes shift is illustrated in FIG. 4. In some embodiments, the fluorescent material ceases to emit visible radiation as soon as the UV radiation ceases (i.e. short half-lives are desirable).

In one embodiment, the fluorescent material is zinc orthosilicate (Zn2SiO4). The Stokes shift is 270 nm in zinc orthosilicate (Zn2SiO4). The fluorescence occurs in the presence of radiation in the second range of wavelength. The second range of wavelengths may be in the UVC region and may have a range of wavelengths from 200 nm to 250 nm. The fluorescence may have a decay period of a few nanoseconds and fluorescence ceases as soon as the radiation in the UVC region is no longer present. The zinc orthosilicate (Zn2SiO4) emits visible radiation in a range of wavelengths that is close to the wavelengths of the maximum sensitivity of scotopic vision in the human eye. Emissions in the first range of wavelengths are close to the wavelengths of the maximum sensitivity of scotopic vision in the human eye.

The fluorescence of the marker is indicative of the presence of UV light, and UVC light in particular. Because the marker ceases to fluoresce as soon as the UVC light emission stops, the marker can be used to indicate the active emission of UVC light. The fluorescence may be reversible and the marker can be used repeatedly. The fluorescent material may not be excited by the electromagnetic radiation other than radiation in the second range of wavelengths. The fluorescent material may not be excited by radiation other than in the desired range of wavelengths. For example, a marker that is sensitive to UVC radiation may not be excited by UVA or UVB radiation.

In some embodiments, the marker comprises fluorescent material in a carrier material. The carrier material may be formed of polyurethane. The polyurethane may be transparent to radiation in the range of wavelengths from 200 nm to 254 nm. The polyurethane may also be transparent to radiation in a first range of wavelengths, from 400 nm to 750 nm. Polyurethane is robust and is resistant to the effect of UVC light on the polymers in the carrier material. The carrier material and fluorescent material suspended therein includes the emitting layer.

In some embodiments, a protective layer of polyurethane may be provided over the fluorescent material on the substrate. The fluorescent material may be provided on a substrate. The substrate may be a flexible material. In some embodiments, the substrate is a flame retardant thermoplastic polybutylene. In some embodiments, other flame retardant flexible substrates may be used.

As illustrated in FIG. 1, a marker is provided comprising a fluorescent material 2. A protective layer 4 is provided over the fluorescent material. A surface of the protective material has a layer of printed ink 6. The printed ink provides indicia 8 on the surface. The printed ink may be opaque. The printed ink may be white and may be selected to match a body color. The ink may be opaque to UVC radiation. UVC radiation may be able to reach the fluorescent material in the regions where the white ink is not printed. When exposed to UVC radiation, the unprinted areas fluoresce. The unprinted areas may form words or symbols. The printing may form warning indicia in negative form.

In some embodiments, a transparent cover is provided over the carrier or protective material. The transparent cover can be arranged to be opaque to UVC light in parts (e.g., where printed material is present on/as part of the cover). The printed material on the cover may be arranged such that there is no change of color of the surface of the marker. The printed material may prevent the transmission of UVC radiation in the areas that have been printed. When exposed to UVC radiation, the unprinted areas fluoresce and the unprinted areas may form warning indicia in negative form.

The marker 16 may therefore act as a warning sign, with the indicia and fluorescence together providing a warning when UV radiation is present. The warning sign may be described as active or responsive, as the warning may be provided only when it is needed, i.e., only when there is UV radiation in the second range of wavelengths. The marker may therefore be arranged to be clearly visible by eye over a range of viewing angles and distances, and the indicia may be sized to be read/interpreted from a suitable distance (e.g., 2 m, 3 m, 5 m, 10 m, or more), such that a viewer does not need to enter an irradiated area to interpret the warning sign. The sizing may therefore be selected based on a size of the room, vehicle interior, or other area to be irradiated. For example, a typical size for a marker (in particular, a surface area of a front face of the marker) may be between 10 cm$^2$ and 300 cm$^2$. The marker may be flat, having a depth much less than either dimension of its front surface, for example, with a depth of less than 5 mm or 2 mm, and optionally less than 1 mm.

Multiple markers 16 may be provided in a room or vehicle, for example, at different locations or in different parts of the room or vehicle.

The emitting layer may extend across the entire area of the face of the marker, or only across one or more portions thereof. In embodiments with a protective layer, the protective layer may extend across the entire area of the face of the marker, or only across one or more portions thereof. For example, the protective layer may extend only across those portions containing an emitting layer. The protective layer may encapsulate the fluorescent material, optionally providing a coating or other layer around the entire marker. In other embodiments, the protective layer only covers the front surface of the marker, or optionally the front surface and sides, so protecting the edges of the layer(s) underneath.

Figure 2:
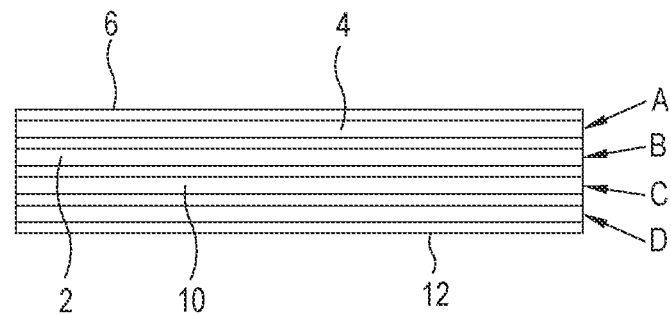
FIG. 2 is a cross section of the marker of FIG. 1.

FIG. 2 is a cross section of the marker of FIG. 1. The fluorescent material 2 is provided. The protective layer 4 is provided over the fluorescent material 2. The protective layer is optional. A layer of ink 6 is provided on the protective layer. In the cross section, it is shown that the fluorescent material 2 is provide on a substrate 10. A layer of adhesive 12 can be provided to attach the marker to a surface.

Four features/layers of the marker 16 are labelled in FIG. 2 for ease of reference:

A. An optional protective layer 4 arranged to cover at least part of a front surface of the marker. The protective layer is at least substantially transparent to the UV radiation arranged to cause the fluorescent material of the marker to fluoresce (e.g. to UVC radiation). The protective layer is also at least substantially transparent to the visible light the fluorescent material of the marker is arranged to emit. One or more markings, such as warning indicia, may be printed on this layer;

B. A layer 2 containing the fluorescent material; for example this may be or comprise a manganese-doped zinc orthosilicate pigment in a polyurethane carrier. One or more markings, such as warning indicia, may be printed on this layer instead of, or as well as, on the protective layer;

C. A carrier substrate 10, for example a flame-retardant thermoplastic polybutylene terephthalate film, which may be flexible. A different flexible substrate, or a rigid substrate, may be used in other embodiments. The substrate may be opaque, optionally to both UV radiation and visible light; and D. An optional adhesive layer 12, which may be used to secure the marker to a wall or other surface.

In other embodiments, the marker 16 may be provided as a fitting to be installed in a vehicle such as an aircraft or ground vehicle or ship.

The marker 16 may be arranged to be wall-mounted. The marker 16 may be relatively thin, for example in the form of a sticker, decal, or plate, for ease of wall-mounting, optionally by an adhesive or by one or more screws or nails. For example, in an aircraft such markers may be installed in the aircraft on surfaces such as sidewalls, bulkheads, galleys, lavatory doors and/or walls. The markers may be adhered to any suitable surface with any suitable adhesive.

The marker can be provided in association with the vehicle and disinfection system described in our co-pending application of the same date. In the vehicle and disinfection system, electromagnetic emission devices are provided in the vehicle and disinfection occurs as controlled by a controller.

The markers described herein can be installed in the vehicle to indicate if harmful UV radiation is present in a confined space.

Figure 6:
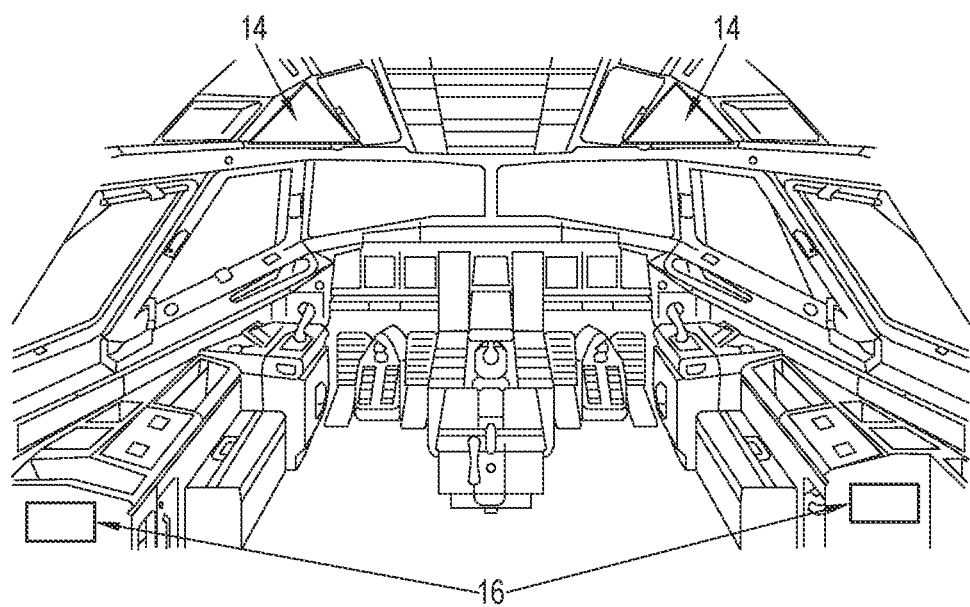
FIG. 6 is an illustration of the marker in place in an aircraft.

FIG. 6 illustrates a vehicle having a disinfection system installed therein.

Electromagnetic emission devices 14 are provided which can be controlled to emit electromagnetic radiation in the UVC region. Markers 16 in accordance with some embodiments are provided in the aircraft cabin to provide warning of the presence of harmful UVC radiation. A visual warning, visible to a viewer by eye, may be provided by the fluorescence, optionally in combination with one or more warning indicia.

A warning of the presence of ultraviolet radiation may therefore be provided by affixing a marker 16, as described herein, to a surface as a warning sign.

The affixing of the marker 16 to a surface may comprise affixing the marker to an internal wall, door, or other surface, of an aircraft cabin.

The affixing of the marker 16 to a surface may comprise using an adhesive to secure the marker to the surface. The adhesive may be provided as an adhesive layer of the marker, the marker taking the form of a sticker or adhesive label. The marker may be flexible so as to conform to a surface (which may not be flat—e.g. curved aircraft walls).

What is claimed is:

1. A marker arranged to indicate the presence of ultraviolet radiation, the marker comprising at least an emitting layer having a fluorescent material arranged to emit visible light in a first range of wavelengths in response to excitation by ultraviolet radiation in a second range of wavelengths, the emission of visible light being reversible and the marker being reusable.

2. The marker of claim 1, wherein the second range of wavelengths is from 200 nm to 300 nm.

3. The marker of claim 2, wherein the second range of wavelengths is from 200 nm to 254 nm.

4. The marker of claim 1, wherein the fluorescent material is provided in a carrier material.

5. The marker of claim 4, wherein the marker comprises a protective layer.

6. The marker of claim 5, wherein the carrier material and the protective layer are both at least partially transparent to radiation with wavelengths from 200 nm to 290 nm and to visible light.

7. The marker of claim 6, wherein at least one of the carrier material or the protective layer is a plastic material stable under the influence of UVC radiation.

8. The marker of claim 1, wherein the fluorescent material absorbs radiation in a range of wavelengths from 200 nm to 280 nm and emits radiation in the visible region.

9. The marker of claim 1, wherein the fluorescent material emits in a range of wavelengths of the visible spectrum that corresponds to scotopic vision.

10. The marker of claim 9, wherein the radiation emitted by the fluorescent material is also detectable by the human eye in photopic vision.

11. The marker of claim 1, wherein the fluorescent material is zinc orthosilicate ($Zn_2SiO_4$).

12. The marker of claim 1, wherein the marker comprises indicia provided on a surface of the marker, the indicia arranged to provide a warning.

13. The marker of claim 12, wherein indicia are printed on a surface of the marker in at least one of a color that matches a base color or a transparent ink that blocks the excitation of fluorescent materials.

14. The marker of claim 1, wherein the marker is adapted to be at least semi-permanently installed in a vehicle or a building.

15. The marker of claim 14, wherein the marker is adapted to be permanently or semi-permanently installed in a confined space in a vehicle cabin.

16. The marker of claim 1, wherein the marker is an adhesive label arranged to be adhered to a surface.

17. The marker of claim 1, wherein the marker is incorporated into a portable apparatus.

18. The marker of claim 1, wherein the marker is a warning sign arranged to provide a visual indication of the presence or absence of ultraviolet radiation.

19. A vehicle or building having a marker in accordance with claim 1, the marker arranged to indicate the presence of ultraviolet radiation.

20. A method of providing a warning of the presence of ultraviolet radiation, the method comprising:
  affixing a marker to a surface as a warning sign, the marker comprising at least an emitting layer having a fluorescent material arranged to emit visible light in a first range of wavelengths in response to excitation by ultraviolet radiation in a second range of wavelengths; the fluorescence being reversible and the marker being reusable.

* * * * *